United States Patent Office 2,744,930
Patented May 8, 1956

2,744,930
N,N-DIPHENYL-N'-AMINOALKYLENE-UREA DERIVATIVES

John Krapcho, Perth Amboy, and William A. Lott, Maplewood, N. J., assignors to Olin Mathieson Chemical Corporation, New York, N. Y., a corporation of Virginia No Drawing. Application August 4, 1954,
Serial No. 447,927

10 Claims. (Cl. 260—553)

This invention relates to new urea derivatives and more particularly to new 1-(basically-substituted alkyl)-3,3-diaryl ureas and acid-addition salts thereof.

The free base compounds of this invention may be represented by the following general formula:

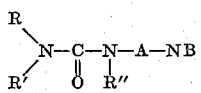

wherein each of R and R' represents an aromatic radical, preferably a 6 to 10 carbon-atom aromatic hydrocarbon radical or an inorganically (e. g. halo or amino)-substituted hydrocarbon radical or an alkoxy-substituted hydrocarbon radical (such as phenyl, tolyl, xylyl, naphthyl, chlorophenyl, bromophenyl, iodophenyl, dichlorophenyl, bromotolyl, iodoxylyl, chloronaphthyl, anisyl, ethoxyphenl, etc.); R" is alkyl (preferably lower alkyl, such as methyl, ethyl, propyl, n-butyl, and n-hexyl) or alkenyl (preferably lower alkenyl, such as allyl, methallyl, 2-butenyl, and 2-hexenyl); A is a lower alkylene radical separating the nitrogen atoms by at least two carbon atoms, and includes such radicals as ethylene, propylene, butylene, and hexylene, whether branched or straight chained; and NB is amino, monoalkylamino [preferably mono(lower alkyl)amino, such as methylamino, ethylamino, isopropylamino, and n-hexylamino], dialkylamino [preferably di(lower alkyl)amino, such as dimethylamino, diethylamino, ethylmethylamino, di(isopropyl)amino, dipropylamino, and dibutylamino], or an N-heterocyclic radical, such as piperidino, pyrrolidino, or morpholino.

Examples of suitable acid-addition salts of the free base compounds of this invention includes the mineral acid salts, such as the hydrohalides (e. g. hyrdochloride, hydrobromide, and hydroiodide), the sulfate, and the phosphate; and the organic acid salts, such as the citrate, tartrate, oxalate, ascorbate, and succinate. (Pharmacologically-acceptable acids are of course employed where the salt form is prepared for therapeutic use.)

A particularly preferred class of the free base compounds of this invention may be represented by the following general formula

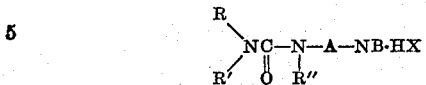

wherein R", A, and NB are as defined hereinbefore, and R''' is hydrogen, halo, amino, lower alkyl, or lower alkoxy (preferably hydrogen).

The compounds of this invention are most easily prepared by reacting a carbamyl halide of the formula

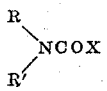

wherein X is a halide (preferably chloride) with an alkylene di-amine of the formula R"NH—A—NB, to form a substituted urea of the formula

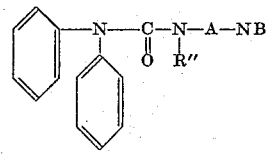

which may then be neutralized to the free base. Other acid-addition salts may be formed either by metathesis with a salt of the desired acid or by reaction of the free base with the desired acid.

The condensation of the carbamyl halide with the alkylene diamine is most advantageously achieved by heating the reactants in equimolecular proportions in an inert solvent, such as toluene or benzene, to a temperature of from 80° C. to 100° C. (preferably to reflux). The resulting hydrohalide salt may then be neutralized to the free base by treatment with an alkali, such as sodium hydroxide or potassium hydroxide.

The following examples are merely illustrative of suitable methods for the practice of this invention, and are in no way to be considered limitative.

EXAMPLE 1

*1-(2-diethylaminoethyl)-3,3-diphenyl-1-methylurea*

A solution of 116 g. of diphenylcarbanyl chloride in 500 ml. of toluene is stirred, cooled, and treated dropwise with a solution of 70.0 g. of N,N-diethyl-N'-methyl-ethylenediamine (J. Chem. Soc., 1935, 1425) in 200 ml. of toluene. The resulting mixture is refluxed for two hours, cooled and treated with a solution of 10 ml. of concentrated hydrochloric acid in 400 ml. of water. The aqueous layer is separated and the toluene phase extracted with 100 ml. of water. After combining the aqueous phases, it is basified with a cold solution of 32 g. of sodium hydroxide in 100 ml. of water. The liberated base is extracted with two 300 ml. portions of ether and dried over magnesium sulfate. After evaporation of the solvent, the residue is distilled; yield about 133 g. (about 82%); B. P. about 179–181° C. (0.3 mm.).

EXAMPLE 2

*1-(2-diethylaminoethyl)-3,3-diphenyl-1-methylurea hydrochloride*

133 g. of 1-(2-diethylaminoethyl)-3,3-diphenyl-1-methylurea (prepared by the method of Example 1) is dissolved in 200 ml. of ether and treated with one equivalent of hydrogen chloride in 104 ml. of absolute alcohol. After dilution of the resulting solution to 800 ml. with ether, a crystalline solid is separated, cooled, and filtered; yield about 142.5 g. (about 79%), M. P. about 114–116° C. This material is recrystallized from 1.1 liters of ethyl acetate; yield about 136 g.; M. P. about 114–116° C.

EXAMPLE 3

*1-(2-diethylaminoethyl)-3,3-diphenyl-1-ethylurea*

A mixture of 33.2 g. of diphenylcarbamyl chloride in 200 ml. of benzene is treated with a solution of 21.0 g. of N,N,N'-triethyl-ethylenediamine (J. Chem. Soc., 1935, 1425) in 100 ml. of benzene. The resulting mixture is refluxed for eight hours and the product then isolated as in Example 1; yield about 32.0 g.; B. P. about 181–193° C. (0.5 mm.).

EXAMPLE 4

*1-(2-diethylaminoethyl)-3,3-diphenyl-1-ethylurea hydrochloride*

32.0 g. of 1-(2-diethylaminoethyl)-3,3-diphenyl-1-ethylurea (prepared by the method of Example 3) is treated in an ether solution with one equivalent of hydrogen chloride in accordance with the method of Example 2; yield about 32.5 g. of product; M. P. about 136–138° C. The latter is recrystallized from butanone; M. P. about 136–138° C.

EXAMPLE 5

*1-(2-diethylaminoethyl)-1-isopropyl-3,3-diphenylurea*

A mixture of 33.2 g. of diphenylcarbamyl chloride and 23.7 g. of N,N-diethyl-N'-disopropylethylenediamine [Ann. Chim. 6, 835 (1951); Chem. Abstracts 47, 2695 (1953)] in 300 ml. of benzene is refluxed for eight hours. The product is isolated as in Example 1; yield about 35.5 g.; M. P. about 174–176° C. (0.2 mm.).

EXAMPLE 6

*1-(2-diethylaminoethyl)-1-isopropyl-3,3-diphenylurea hydrochloride*

35.5 g. of 1-(2-diethylaminoethyl)-1-isopropyl-3,3-diphenylurea (prepared by the method of Example 5) is treated with an equivalent amount of hydrogen chloride in accordance with the method of Example 2. The hydrochloride salt is obtained in a yield of about 38 g.; M. P. about 135–137° C. After recrystallization from 100 ml. of butanone, the product weighs about 30.5 g.; M. P. about 161–162° C.

EXAMPLE 7

*1-(3-diethylaminopropyl)-3,3-diphenyl-1-methylurea*

A mixture of 23.1 g. of diphenylcarbamyl chloride and 14.2 g. of N,N-diethyl-N'-methyl-1,3-propanediamine [Bull. soc. Chim. (5), 6, 501 (1939); Chem. Abstracts 33, 5807 (1939)] in 200 ml. of benzene is refluxed for two hours. The product is isolated as in Example 1; yield about 28.0 g.; B. P. about 185–189° C. (0.2–0.3 mm.).

EXAMPLE 8

*1-(3-diethylaminopropyl)-3,3-diphenyl-1-methylurea hydrochloride*

28.0 g. of 1-(3-diethylaminopropyl)-3,3-diphenyl-1-methylurea (prepared by the method of Example 7) is treated with an equivalent amount of hydrogen chloride in accordance with the method of Example 2. The hydrochloride salt obtained is then recrystallized from a mixture of ethanol and diethyl ether; M. P. about 140.5–141.5° C.

In a similar manner, by substituting other alkylenediamines for the alkylenediamines in the above odd-numbered examples, the corresponding free bases are obtained. Thus when an equivalent amount of N,N,N'-trimethylethylenediamine or N,N-dimethyl-N'-ethylethylenediamine is substituted for N,N,N'-triethyl-ethylenediamine in Example 3, 1-(2-dimethyl-aminoethyl)-3,3-diphenyl-1-methylurea and 1-(2-dimethylaminoethyl)-3,3-diphenyl-1-ethylurea are obtained, respectively; and these may be converted to their hydrochloride salts by the method of Example 2.

The method of the above odd-numbered examples is also useful in preparing 1-[ω-(1-N-heterocyclic)-alkyl]-3,3-diphenyl-1-(lower alkyl)ureas by substituting ω-(1-N-heterocyclic)-alkyl-(lower alkyl) amines for the diamines of the example. Thus N-piperidinoethyl, methylamine, N-pyrrolidinoethyl, ethylamine, and N-morpholinopropyl, methylamine yield 1-(2-piperidinoethyl)-3,3-diphenyl-1-methylurea, 1-(2-pyrrolidinoethyl)-3,3-diphenyl-1-ethylurea, and 1-(3-morpholinopropyl)-3,3-diphenyl-1-methylamine, respectively.

In a similar manner, by substituting other mineral and organic acids for hydrogen chloride in the above even-numbered examples, other acid-addition salts may be formed. Thus an equivalent amount of hydrogen bromide or hydrogen iodide form the corresponding hydrobromide and hydroiodide salts; and an equivalent amount of tartaric acid or citric acid yields the corresponding tartrate and citrate salts, respectively, etc.

EXAMPLE 9

*1-(2-diethylaminoethyl)-1-allyl-3,3-diphenylurea*

(a) *N-allyl-N',N'-diethylethylenediamine.*—A solution of 171 g. of allylamine in 450 ml. of absolute alcohol is treated with 172 g. of 2-diethylaminoethyl chloride hydrochloride and then 120 g. of finely divided potassium carbonate. The resulting mixture is refluxed for two hours and cooled. 400 ml. of water is then added and the mixture is added to a solution of 200 g. of sodium hydroxide in 400 ml. of water. The product is extracted with ether and dried over magnesium sulfate. After evaporation of the solvent, the product is fractionated to yield about 87.4 g. of colorless product; B. P. about 85–87° C. (25 mm.).

(b) *1-(2-diethylaminoethyl)-1-allyl-3,3-diphenylurea.*—A mixture of 25 g. of diphenylcarbamyl chloride and 16.9 g. of the N-allyl-N',N'-diethylethylenediamine produced in section *a* in 450 ml. of benzene is refluxed for two hours and the product isolated as in Example 1; yield about 21.5 g.; B. P. about 182–193° C. (0.5 mm.).

EXAMPLE 10

*1-(2-diethylaminoethyl)-1-allyl-3,3-diphenylurea hydrochloride*

21.5 g. of 1-(2-diethylaminoethyl)-1-allyl-3,3-diphenylurea (prepared by the method of Example 9) is treated with an equivalent amount of hydrogen chloride in accordance with the method of Example 2. The hydrochloride salt formed is purified by crystallization from ethyl acetate; yield about 15 g.; M. P. about 134.5–136.5° C.

The compounds of this invention are useful as quick-acting local anesthetics and also have antispasmodic activity. Thus, 1-(2-dimethylaminoethyl)-3,3-diphenyl-1-methylurea hydrochloride (the compound of Example 2) is much superior with respect to rate of onset than both the corresponding "demethylated" derivative, 1-(2-diethylaminoethyl)-3,3-diphenylurea hydrochloride, and Procaine, as indicated by the following test on rats. Each rat was injected intraperitoneally with 0.2 cc. of an aqueous solution containing the indicated per cent of 1-(2-diethylaminoethyl)-3,3-diphenylurea hydrochloride, Procaine, and 1-(2-diethylaminoethyl)-3,3-diphenyl-1-methylurea hydrochloride (indicated simply as "methyl urea derivative"), with the following results:

RAT SCIATIC NERVE BLOCK

| Composition | Onset (minutes) |
|---|---|
| 0.5% 1-(2-diethylaminoethyl)-3,3-diphenylurea hydrochloride | 4.5 |
| 2% Procaine | 4.0 |
| 2% methyl urea derivative | 2.1 |
| 1% methyl urea derivative | 2.2 |
| 0.5% methyl urea derivative | 2.6 |

An injectable solution of a compound of this invention may be prepared by dissolving the compound in an aqueous injection medium to a final concentration in the range of 0.1% to 2.0% (preferably 0.5% to 1.0%). The solute may consist solely of the compound or of both the compound and another local anesthetic, such as Procaine. Furthermore, a minute amount (about 0.001%) of epinephrine or other vasoconstrictor may be incorporated in the medium.

The invention may be otherwise embodied within the scope of the appended claims.

We claim:
1. Compounds of the class consisting of: free bases having the general formula:

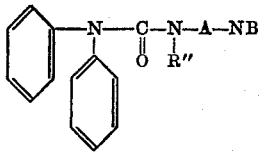

wherein R" is a radical selected from the class consisting of lower alkyl and lower alkenyl, A is a lower alkylene radical separating the nitrogen atoms by at least two carbon atoms, and NB is a radical selected from the class consisting of amino, mono-(lower alkyl) amino, di(lower alkyl) amino, piperidino, pyrollidino, and morpholino; and the pharmacologically-acceptable acid-addition salts thereof.

2. A 1-(dialkylaminoalkyl)-1-alkyl-3,3-diphenylurea wherein each alkyl group is a lower alkyl radical.

3. A pharmacologically-acceptable acid-addition salt of a 1-(dialkylaminoalkyl)-1-alkyl-3,3-diphenylurea, wherein each alkyl group is a lower alkyl radical.

4. 1-(2-diethylaminoethyl)-3,3-diphenyl-1-methylurea.

5. 1-(2-diethylaminoethyl)-3,3-diphenyl-1-methylurea hydrochloride.

6. 1-(2-diethylaminoethyl)-3,3-diphenyl-1-isopropylurea hydrochloride.

7. A 1-(dialkylaminoalkyl)-1-(lower alkenyl)-3,3-diphenylurea wherein each alkyl group is a lower alkyl radical.

8. A pharmacologically-acceptable acid-addition salt of 1-(dialkylaminoalkyl)-1-(lower alkenyl)-3,3-diphenylurea wherein each alkyl group is a lower alkyl radical.

9. 1-(2-diethylaminoethyl)-1-allyl-3,3-diphenylurea.

10. 1-(2-diethylaminoethyl)-1-allyl-3,3-diphenylurea hydrochloride.

References Cited in the file of this patent
UNITED STATES PATENTS

| | | |
|---|---|---|
| 2,673,878 | Cusic | Mar. 30, 1954 |
| 2,681,929 | Cusic | June 22, 1954 |